March 28, 1950            G. CARLSON            2,502,368
INTERCHANGEABLE HANDLE FOR GARDEN
AND THE LIKE TOOLS
Filed Nov. 15, 1945
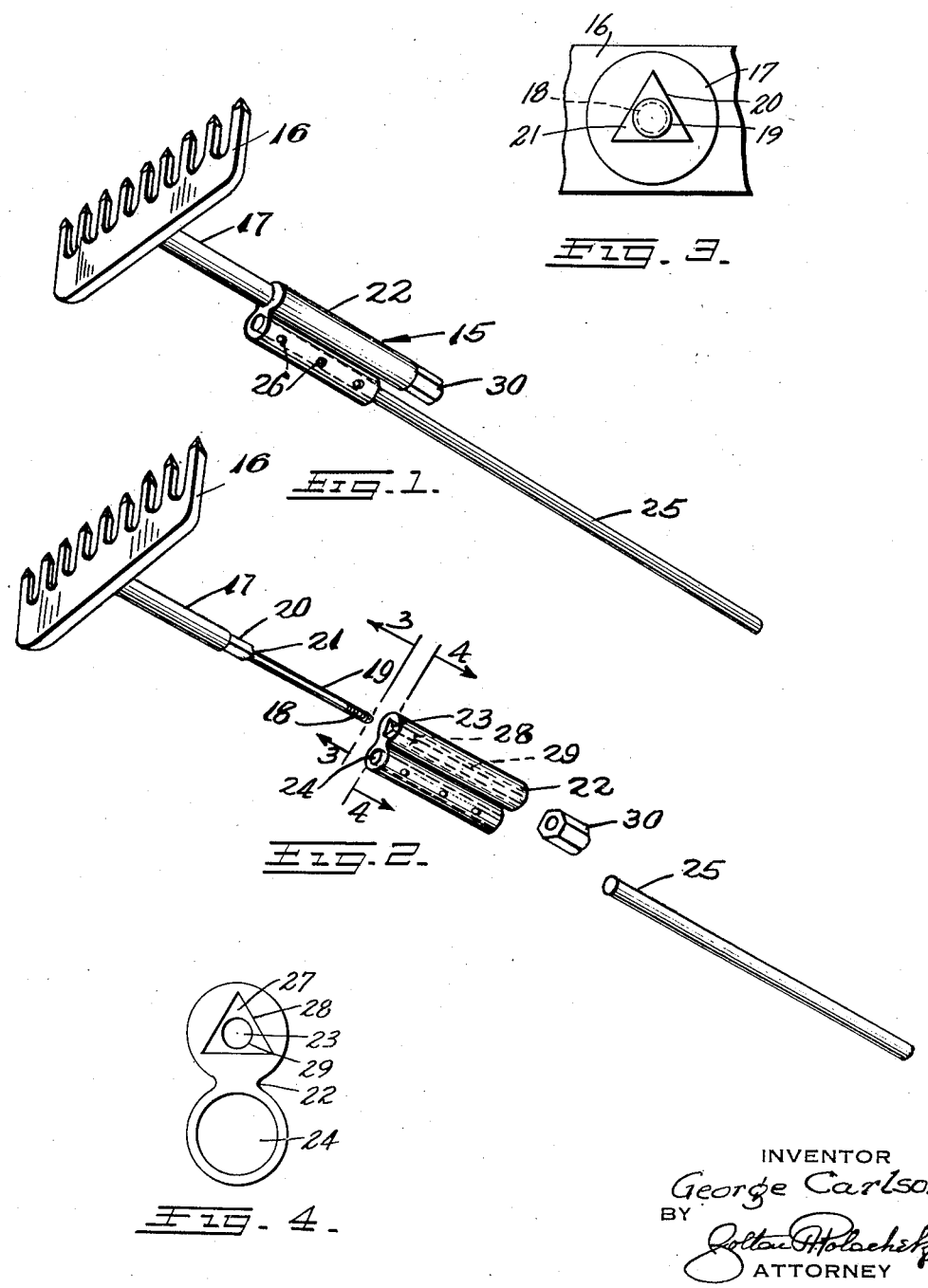
INVENTOR
George Carlson
BY
ATTORNEY Patented Mar. 28, 1950

2,502,368

UNITED STATES PATENT OFFICE 2,502,368

INTERCHANGEABLE HANDLE FOR GARDEN AND THE LIKE TOOLS

George Carlson, Hawthorne, N. Y.

Application November 15, 1945, Serial No. 628,811

2 Claims. (Cl. 306—38)

This invention relates to new and useful improvements in long handled tools, and more specifically, to a combination of a garden or other tool and a detachable handle.

The chief objects of my invention are to provide an improved form of handle, an improved form of shank on the tool, and an improved means of detachably joining the handle to the shank so that the same handle may be used consecutively with a number of tools having suitable shanks.

Another object is to provide a joining means that will enable the handle to be disengaged quickly from the tool and engaged quickly with another tool suitably formed.

A further object is to provide a joining means which, when locked, will not permit relative movement between the handle and the tool.

Still another object is to provide an improved combination whose parts are simple and can be manufactured cheaply and on a large scale.

I accomplish these and other objects by providing a tube with two bores, the shank of the tool being adapted to fit in one of the bores and having a shoulder coacting with a flange in the bore, the tool being locked in position by a nut engaging threads on the end of the shank, and the handle being adapted to fit in the other bore and being secured to the tube by rivets, or other holding means.

Other objects and features of my invention will appear as the specification proceeds.

For further comprehension of the invention, and of the objects and advantages thereof, reference will be had to the following description and accompanying drawings, and to the appended claims in which the various novel features of the invention are more particularly set forth.

In the accompanying drawings forming a a material part of this disclosure:

Fig. 1 is a perspective view of a combination of a garden tool and a detachable handle.

Fig. 2 is a perspective view of the combination shown in Fig. 1 disassembled.

Fig. 3 is a fragmentary enlarged end elevational view of the shank of the tool looking in the direction of the arrows 3—3 in Fig. 2.

Fig. 4 is an enlarged end view of the double bored tube of the detachable handle looking in the direction of the arrows 4—4 in Fig. 2.

In the drawings and in the specification, in which like reference numbers refer to similar parts, the combination garden or other tool includes a detachable handle 15, and a tool 16 having a shank 17 formed with threads 18, an end portion 19 of the shank being cylindrical, an adjoining portion 20 having a triangular cross-section transverse to the axis of the shank (see Fig. 3) whose area is larger than the transverse cross-sectional area of the cylindrical portion 19, whereby a shoulder 21 is formed at the juncture of portions 19 and 20. The detachable handle is comprised of a tube 22 having two bores 23 and 24, and a handle 25 fitting slidably in bore 24 and secured to the tube by rivets 26. The bore 23 has an internal flange 27 (see Fig. 4), a portion 28 of the bore 23 being triangular in cross-section to receive and fit the triangular portion 20 of the tool shank, and a portion 29 of the bore 23 being circular in cross-section to receive and fit the cylindrical portion 19 of the tool shank. A nut 30 having threads capable of engaging threads 18 on the shank locks the tool and handle in functional position.

To disengage the tool and handle, the nut 30 is removed and the shank of the tool withdrawn from the bore 23. Another tool having a shank identical with the shank 17, can be inserted in the tube and locked in functioning position, thus accomplishing my stated objects, and permitting the detachable handle to be used with a variety of tools having suitable shanks.

If it is desired to construct the present invention of plastic, or other similar material it would be advisable to make handle 25 an integral part of tube 22 thus eliminating the necessity for bore 24.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In combination a tool and quick interchangeable handle therefor comprising, a tool having an extended shank being formed with a plurality of integral sections, said sections being successively reduced in diameter toward the extremity of said shank, threads provided about the extreme end portion of said shank, the shank portion adjoining said threaded end portion being polygonal in cross section and being defined by shoulders at its junctions with those shank section portions immediately adjoining it, a handle fixture composed of a housing having parallel bores extending therethrough, one hollow bore being of a cross sectional configuration, conforming to and embracing the polygonal shank portion which projects therethrough, a nut threaded on the end of the shank abutting the housing maintaining it on said polygonal shank portion to lock it against rotation, and an elongated handle extending into the housing and being secured therein against removal and revolution by rivets carried by said housing engaging with the handle.

2. An article of the class described comprising a tool having a shank integrally formed therewith, said shank having an intermediate portion of irregular cross section and an end portion of reduced circular cross section and formed with threads, a housing having a handle extending from one end thereof, said housing having a portion extended laterally from one side thereof and formed with a bore arranged parallel to said handle, said bore having its end opposite the end of said housing from which said handle extends irregular in cross section matching the cross sectional shape of the intermediate portion of said shank and its end adjacent the end of said housing from which said handle extends circular in cross section matching the cross sectional shape of the end portion of said shank, so that said shank may be extended through said bore from the end of the housing opposite the end from which said handle extends to have its threaded end project from the end of the housing from which said handle extends and have its intermediate portion engaged into the irregularly shaped end portion of said bore to retain said shank against rotation relative to said housing, and a nut threaded onto the extended threaded end portion of said shank and against the adjacent end portion of said housing for securing said shank against longitudinal displacement from said housing.

GEORGE CARLSON.

REFERENCES CITED

The following references are of record in the file of this patent:

UNITED STATES PATENTS

| Number | Name | Date |
| --- | --- | --- |
| 280,667 | P'Pool | July 3, 1883 |
| 577,220 | Whitehead | Feb. 16, 1897 |
| 685,872 | Sanford | Nov. 5, 1901 |
| 1,004,242 | Chase | Sept. 26, 1911 |
| 1,203,637 | Lutz | Nov. 7, 1916 |
| 1,833,236 | Smith | Nov. 24, 1931 |